No. 885,121. PATENTED APR. 21, 1908.
C. A. WINTER.
PUNCTURE TELLTALE.
APPLICATION FILED AUG. 14, 1906.

2 SHEETS—SHEET 1.

WITNESSES
Max B. A. Doring.
Lillie Cass

INVENTOR
Charles A. Winter,
BY
Prindle and Williamson
ATTORNEYS

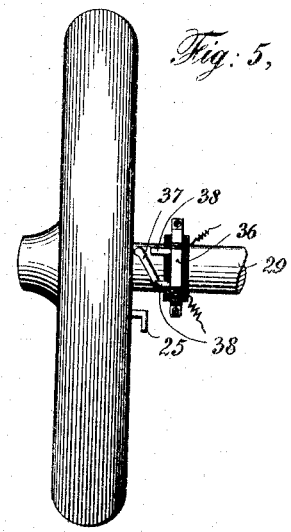
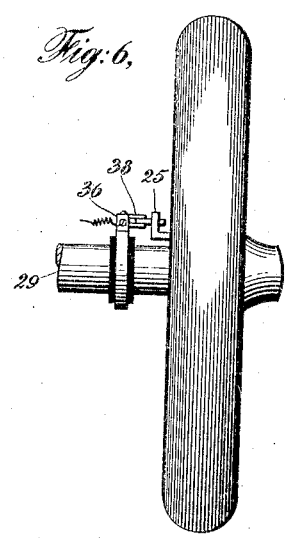
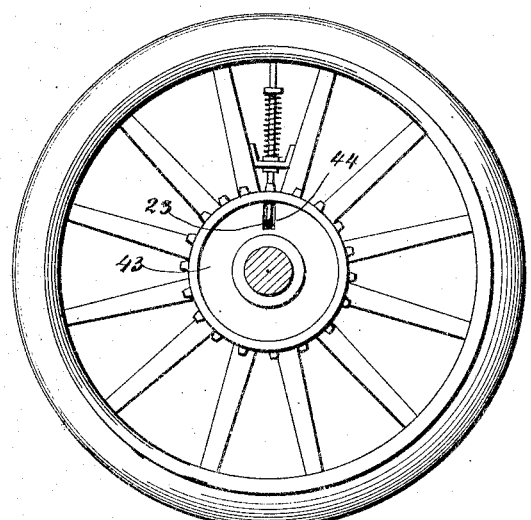
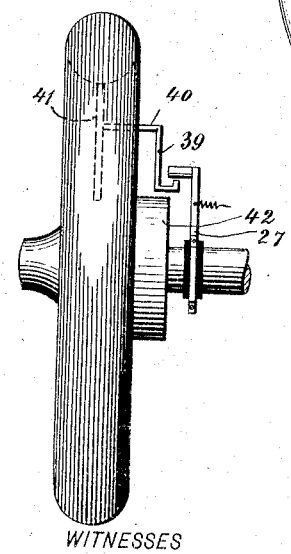
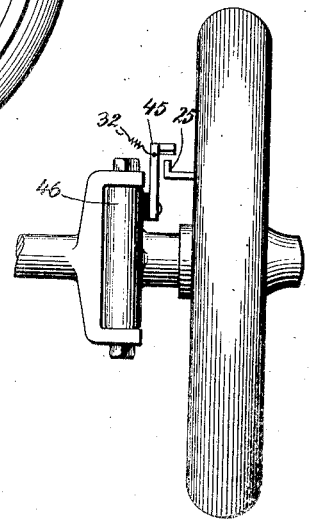

UNITED STATES PATENT OFFICE.

CHARLES A. WINTER, OF NEW YORK, N. Y.

PUNCTURE-TELLTALE.

No. 885,121.  Specification of Letters Patent.  Patented April 21, 1908.

Application filed August 14, 1906. Serial No. 330,592.

*To all whom it may concern:*

Be it known that I, CHARLES A. WINTER, of New York, in the county of New York and in the State of New York, have invented a certain new and useful Improvement in Puncture-Telltales, and do hereby declare that the following is a full, clear, and exact description thereof, reference being had to the accompanying drawings, in which—

Figure 1:
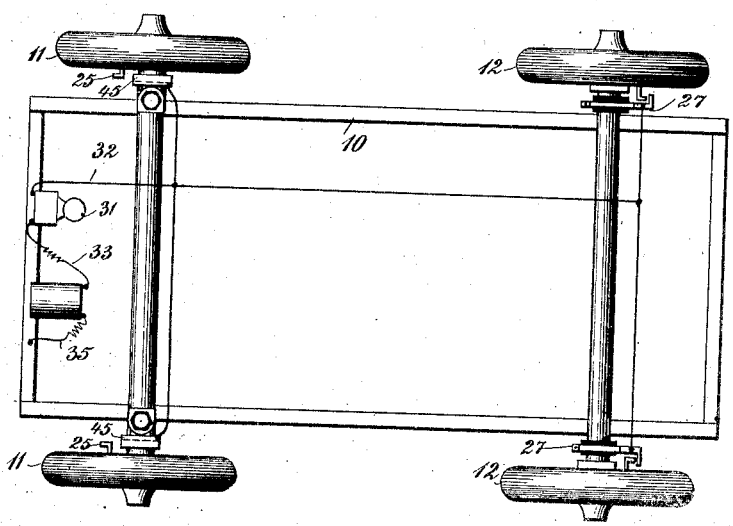
Figure 2:
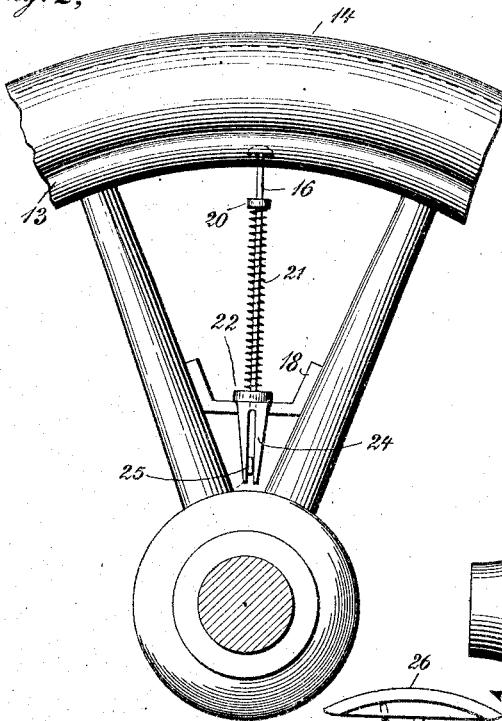
Figure 3:
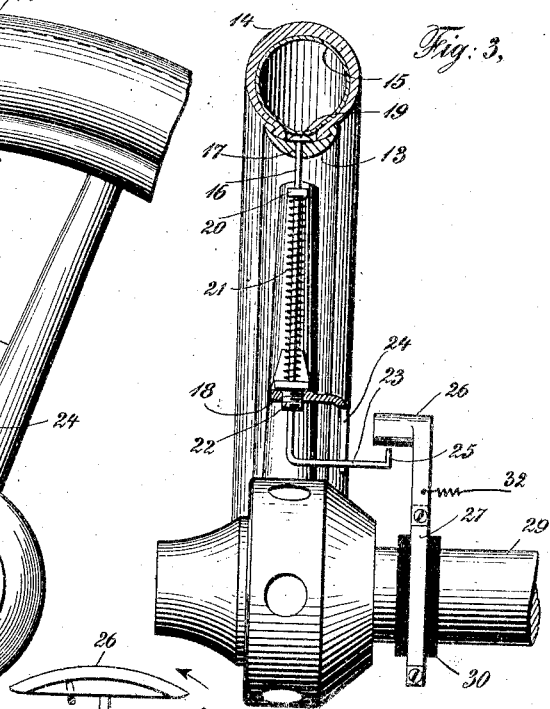
Figure 4:
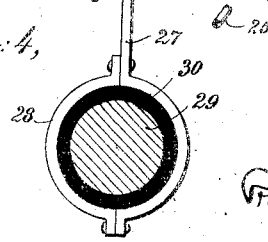

Figure 1 is a bottom plan view of a vehicle provided with my invention. Figs. 2 and 3 are respectively a fragmentary side elevation and section of a wheel and axle equipped with my puncture telltale. Fig. 4 a detail view of a form of axle supported contact I employ. Figs. 5 and 6 are respectively top and side elevations of an axle and wheel having another embodiment of my invention. Figs. 7, 8 and 9 illustrate the application of my invention to wheels of different sorts.

The object of my invention has been to provide means which shall indicate to the user of an automobile, or other vehicle having pneumatic tires, the fact that the tire has lost some of its pressure, or has been punctured, immediately upon the occurrence of a puncture, in order that, without being under the necessity for constantly watching the tires, the driver may immediately stop his vehicle and prevent the much greater and often incurable injury that comes from running the vehicle on a flat tire, and to such ends my invention consists in the puncture telltale, hereinafter specified:—

In carrying my invention into practice, I provide a signal or indicator of any sort, that can be operated by the deflation or partial deflation of the pneumatic tire.

I realize that my invention is capable of embodiment in many different forms, but I have shown for illustration the form which I consider most convenient for actual use. In such embodiment, which is illustrated in the accompanying drawings, the vehicle is an automobile consisting of a body 10 having front and rear wheels 11 and 12 respectively, each wheel has a rim 13 on which is secured the tough outer portion of the tire, called the shoe, 14, and within the shoe is the air-tight inner tube 15. In this specific embodiment of my invention, I provide a rod or plunger 16 which is movably mounted in a hole 17 in the felly and rim of the wheel and in a hole passing through a bracket 18 secured upon or between certain spokes of the wheel. The outer end of the plunger carries a head 19 that is adapted to rest against the inner tube 15, so that the pressure of the air in the inner tube will normally force the plunger inward, or toward the hub.

In order that the plunger may follow the tube, or push it outward when deflation to any extent occurs, it is provided with a cross-pin or washer 20, and a spring 21 is interposed between the washer 20 and a screw-sleeve 22 that is threaded into a hole in the bracket 18. By screwing the sleeve 22 up or down in the bracket 18, the tension of the spring can be adjusted, so as to give notice that the deflation has progressed to the extent allowed by the adjustment.

The inner end 23 of the plunger is bent toward the body of the vehicle, and extends through a lateral slot in an arm or flange 24 on the bracket 18, so that it is guided by said slot, and is prevented from turning about the axis of the plunger. The arm 23 is provided with an outwardly extending finger 25. When the tire is deflated, the plunger and with it the finger 25 move outward. I provide means on the axle or body of the vehicle which will operate a signal when the finger 25 sweeps around in its outer position. To illustrate such means, I have mounted a wiper 26 on a bracket 27 whose lower end forms half of a clamp 28 that is clamped about the axle 29, insulation 30 being interposed between the clamp 28 and the axle. The wiper 26 has its under surface formed on the arc of a circle struck from the center of the axle, so that, as the finger 25 passes around in its advanced or more outward position, it can brush along the under surface of the wiper 26 a sufficient length of time to enable electricity to pass from the one to the other, and long enough to properly operate a signal. The signal consists, as I have illustrated it, of an electric bell 31 mounted on the body, preferably the dashboard, of the vehicle, and having one wire 32 connecting it with the wiper, the other wire 33 being in circuit with a battery 34 (which may be the main battery of the automobile, if the vehicle have such a battery). One pole of the battery is connected by a wire 35 with the frame of the vehicle, and is thus in circuit through the axle and wheel and a wire 36 with the finger 25. The wire 32 may connect with the bracket 27 of each of the other wheels of the automobile, and such wheels may be provided with plungers like that before described.

In the operation of my device, when a puncture or leak occurs, and the inner tube is partially or wholly deflated, it permits the plunger to move outward under the action of the spring. This causes the finger 25 to move outward until it describes a path where it will contact with the inner or under surface of the wiper 26. Current then flows from the battery to the frame of the machine, through the axle and wheel to the finger 25 and passes to the wiper at each rotation of the finger, and thence back to the bell and through the battery. This rings the bell and warns the driver immediately that deflation has occurred to the extent at least of the adjustment. He is thus enabled to immediately stop the machine and repair the puncture, which is an operation easily performed and involving but trifling expense. If it were not for the signal, the operator would either have to be constantly watching the four tires of his vehicle, either visually or through the sense of feeling, greatly to the detriment of the comfort and pleasure of using the automobile, or he would be likely to run for some distance with the tire deflated before he became aware of the fact and possible injury. This running of the vehicle with the deflated tire for a very short distance would cause the shoe to be ground between the unyielding rim of the wheel and hard road and thus to be speedily injured beyond repair, so that a new shoe, which is the most expensive part of the tire, and probably a new inner tube, would have to be supplied.

It is obvious that there may be variations in the above illustrated construction, for instance, the magnet of the bell, instead of working a clapper, or the finger 25, may be used to disconnect the circuit of the sparking device of an explosive machine so as to stop the automobile upon the occurrence of a puncture, or it may be used to operate a brake for the same purpose, and give the alarm at the same time.

As I have illustrated my invention, the bell will be rung for periods whose length depends upon the length of the under surface of the wiper 26, which length can be varied as desired. If it is wished to ring the bell continuously, the arc may be extended so as to make a complete circle, or the knife-switch which I have illustrated in Figs. 5 and 6, may be substituted for the wiper. Such switch consists of a body 35 having a knife 37 pivoted thereto, and having two contacts 38 between which the knife is adapted to be forced by the finger 25 as it rotates. When the finger 25 has struck the knife and forced it between the contacts, the bell will ring until the knife is removed by hand. Where the wiper is a complete circle, the alarm will be given although the vehicle is not moving.

To illustrate the application of my invention to various situations, I have shown in Fig. 7 the application of the plunger with its accompanying parts to the rear wheel of an automobile having a brake drum or sprocket wheel attached. In this instance, the finger 39 is hung from a bracket 40 that is carried by the plunger 41 and extends over the brake drum 42. Instead of the construction just described, the brake drum or sprocket wheel 43 may, as illustrated in Fig. 8, have a hole 44 formed therethrough, and the arm 23 may extend through such hole in order that the finger may reach the wiper or knife switch. Where the front wheels are mounted on steering knuckles, as illustrated in Fig. 9, the wiper 45 may be mounted upon the member 46 of the steering knuckle so that the wiper may always be in the same relative position to the finger 25. In this instance enough slackness in the wire 32 must be provided to permit the turning of the knuckle member.

I claim:—

1. In a puncture telltale, the combination of a pneumatic wheel tire, an electric circuit, and a circuit closing device comprising a contact carried by the wheel, a part connected with said contact and engaged by the tire, a contact mounted on a part stationary with reference to the wheel in the path of the wheel-carried contact, the tire when inflated acting on the part engaged thereby to keep the wheel-carried contact from touching the stationary contact, and means that moves the wheel-carried contact to cause its engagement with the stationary contact when the tire is deflated.

2. In a pneumatic tell-tale, the combination of a pneumatic wheel tire, an electric circuit, and a circuit-closing device comprising a contact carried by the wheel, a part connected with said contact and engaged by the tire, a contact mounted on the wheel axle in the path of said wheel-carried contact, the tire, when inflated, acting on the part engaged thereby to keep the wheel-carried contact from touching the stationary contact, and a spring acting on the wheel-carried contact to move it when the tire is deflated, to cause the closing of the circuit.

In testimony that I claim the foregoing I have hereunto set my hand.

CHARLES A. WINTER.

Witnesses:
LILLIE F. CASS,
EDWIN J. PRINDLE.